United States Patent
Van Den Oord

(10) Patent No.: US 6,442,902 B1
(45) Date of Patent: Sep. 3, 2002

(54) SEALING STRIPS

(75) Inventor: Henricus Van Den Oord, 'S-Hertogenbosch (NL)

(73) Assignee: Gencorp Property Inc., Rancho Cordova, CA (US)

( * ) Notice: Subject to any disclaimer, the term of this patent is extended or adjusted under 35 U.S.C. 154(b) by 0 days.

(21) Appl. No.: 09/445,746

(22) PCT Filed: May 14, 1998

(86) PCT No.: PCT/GB98/01371
§ 371 (c)(1),
(2), (4) Date: Dec. 30, 1999

(87) PCT Pub. No.: WO99/03695
PCT Pub. Date: Jan. 28, 1999

(30) Foreign Application Priority Data

Jul. 16, 1997 (GB) .............................. 9714914

(51) Int. Cl.$^7$ ................................. E06B 7/22
(52) U.S. Cl. .................................... 49/498.1
(58) Field of Search ................ 49/498.1, 475.1, 49/490.1, 479.1

(56) References Cited

U.S. PATENT DOCUMENTS

| | | | |
|---|---|---|---|
| 4,448,430 A | 5/1984 | Bright | 277/184 |
| 4,455,785 A * | 6/1984 | Wahr et al. | 49/498.1 |
| 5,123,693 A * | 6/1992 | Karashima et al. | 49/490.1 X |
| 5,511,343 A * | 4/1996 | Guillon | 49/475.1 X |
| 5,826,378 A * | 10/1998 | Gallas | 49/498.1 |

FOREIGN PATENT DOCUMENTS

| | | | |
|---|---|---|---|
| EP | 0 178 064 | 4/1986 | |
| EP | 0 434 210 | 6/1991 | |
| EP | 0 805 058 | 11/1997 | |
| EP | 0 836 962 | 4/1998 | |
| FR | 939443 | * 11/1948 | 49/498.1 |
| GB | 2 062 733 | 5/1981 | |
| GB | 2 086 459 | 5/1982 | |
| GB | 2 115 043 | 9/1983 | |

* cited by examiner

Primary Examiner—Jerry Redman
(74) Attorney, Agent, or Firm—Leydig, Voit & Mayer, Ltd.

(57) ABSTRACT

A sealing strip (6), such as for a vehicle door frame, comprises a gripping part (10) of channel-shape and a tubular sealing part (8). The sealing part (8) is made of material (16, 16A) at least part (16A) of which is verty soft to improve the sealing properties of the strip and to reduce weight. The hollow interior of the sealing part (8) is divided by an interior wall (28). In order to resist partial collapse or wrinkling of the sealing part (8) when the strip (6) is bent to follow a curve in the door frame, the interior wall (28) incorporates reinforcement (30) which may be metal wire or sheet. This is longitudinally compressible but stiff in the perpendicular direction.

9 Claims, 1 Drawing Sheet

SEALING STRIPS

BACKGROUND OF THE INVENTION

The invention relates to a sealing strip, comprising a longitudinally extending sealing part defining a longitudinal hollow interior which becomes partially compressed in use to carry out a sealing function, the hollow interior having an interior wall extending across it.

DESCRIPTION OF THE RELATED ART

Such a strip is known from GB-A-2 115 043. The interior wall helps to prevent partial collapse of the hollow interior of the strip at bends. However, it is increasingly required to manufacture such strips from softer material. The use of such softer material increases the problem of such partial collapse. The invention aims to deal with this problem.

SUMMARY OF THE INVENTION

According to the invention, therefore, the known strip is characterised in that the interior wall incorporates reinforcing material for resisting partial collapse of the hollow interior when longitudinal bending of the sealing strip occurs which bends the longitudinal axis of the hollow interior.

BRIEF DESCRIPTION OF THE DRAWINGS

Sealing strips embodying the invention, for use in carrying out sealing functions in motor vehicle bodies, will now be described, by way of example only, with reference to the accompanying diagrammatic drawings in which.

DESCRIPTION OF THE PREFERRED EMBODIMENTS

Figure 1:
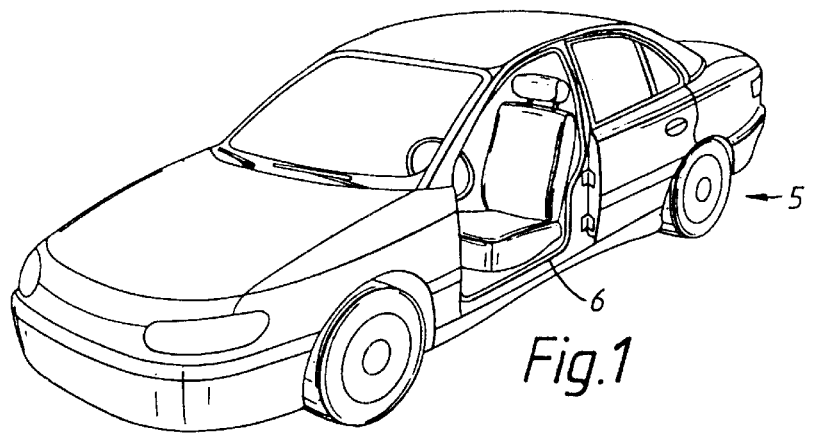
FIG. 1 is a perspective view of a motor vehicle to which the sealing strips may be fitted.

FIG. 1 shows a motor vehicle body 5 with one of its doors removed to show a sealing strip 6 mounted around the periphery of the door opening. In use, the closing door closes onto the sealing strip 6 to provide a weather-tight seal.

Figure 2:
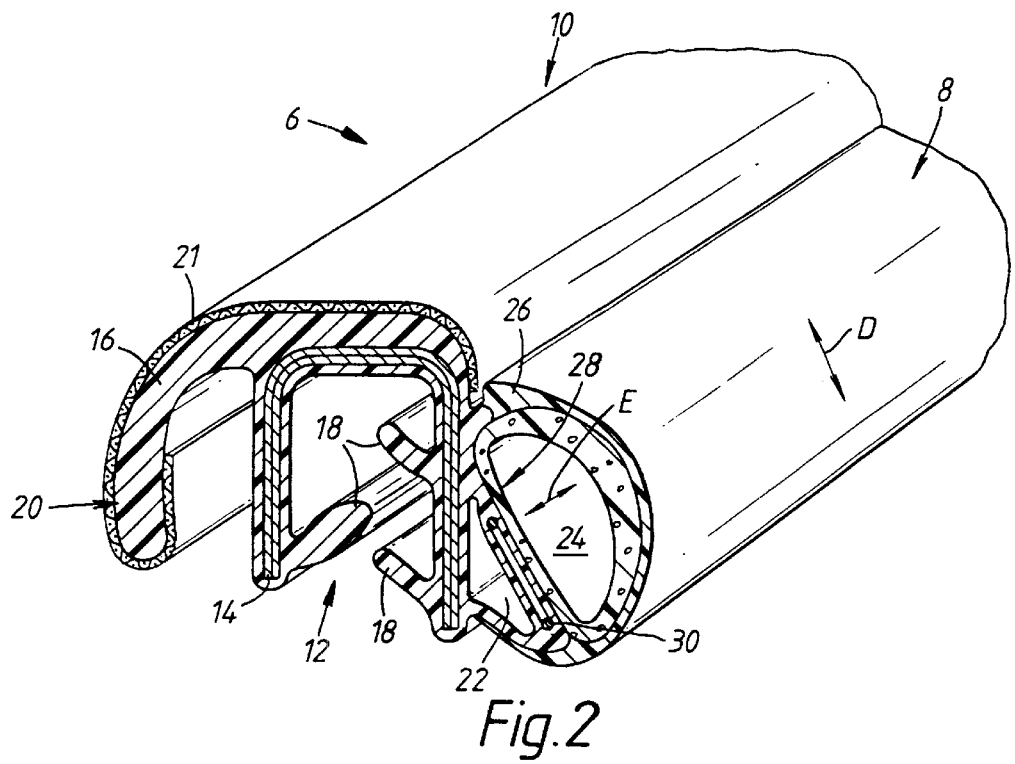
FIG. 2 is a perspective view of one of the sealing strips in cross-section.

One form of the sealing strip 6 is shown in FIG. 2. It comprises a sealing portion 8 and a gripping or mounting portion 10. The gripping portion 10 is in the form of a longitudinal channel 12. In use, this is embracingly clamped to the surround of the door opening. More specifically, the surround of the door opening is normally defined by a flange where the inner and outer body panels are welded together.

As shown in FIG. 2, the gripping portion 10 comprises a reinforcing core or carrier 14 such as made of resilient metal or other material, which is embedded in flexible material 16 such as rubber or plastics material. For example, the carrier 14 may be made of metal and in the form of (inverted) U-shaped elements arranged side-by-side to define the channel 12 and connected together by integral short connecting links or disconnected from each other. Other forms of carrier are, of course, possible. The carrier may be made of wire looped to and fro. The carrier 14 may be incorporated in the material 16 using a cross-head extruder. The carrier need not be made of metal. A flexible but substantially non-extensible tape may be incorporated into the material 16.

The material 16 is formed to define integral gripping lips 18 positioned on the opposite inside facing walls of the channel 12. These make contact with the opposite faces of the flange and increase the frictional gripping of the gripping portion 10. Advantageously, the material of the lips 18 is arranged to be softer than the remainder of the extruded material 16 to increase the frictional grip of the lips against the flange.

As shown in FIG. 2, the material 16 is formed to define a so-called "cosmetic lip" 20. This is used to cover over, and to help to secure, the edge of a trim panel or the like inside the vehicle body.

The gripping portion 10 may be provided with a fabric covering.

The sealing portion 8 is of generally hollow tubular form and may be co-extruded with the material 16. In this example, the extruded material 16 is extended to define a first tubular part having a hollow interior of triangular form 22 in cross-section. Softer material 16A is co-extruded with the material 16 and defines a generally semi-circular hollow interior 24. The sealing portion 8 thus has a hollow interior made up of the hollow portions 22 and 24 which are separated by a wall 28 formed where the materials 16 and 16A come together.

The; material 16A may be of soft open-cellular form and is covered over by a co-extruded layer 26 which may be of closed-cellular form.

However, it is not necessary for the gripping portion 8 to be coextruded with the material 16 of the gripping portion 10. Instead, the sealing portion 8 may be made separately, by extrusion from appropriate material(s), and then secured to the gripping portion 10 by adhesive.

The covering material 26 may be coloured for cosmetic purposes.

In use, the gripping portion 10 mounts the sealing strip on the door surround, so that the sealing portion 8 extends around the door opening, on the outside of the vehicle body. The closing door thus partially compresses the sealing portion 10 which thereby provides a weather-tight seal. When mounted in ths way, the mouth of the channel 12 will of course face away from the centre of the door opening.

In order to provide good sealing, it is desirable that the material 16A should be very soft and flexible. In this way, it can provide effective sealing even if there are discontinuities or variations in thickness in the flange. Soft material is also advantageous because it may be of cellular form and therefore light in weight. However, it is necessary for the sealing strip 6 to be bent to follow curves or corners in the door surround. When bent in this way, the mouth of the channel 12 is on the outside of the curve or corner and bent lengthwise to follow the curve or corner. There will therefore be a tendency for the sealing portion 8 to become wrinkled at the curves or corners. This bending thus similarly bends the longitudinal axis of the hollow sealing portion 8 in the same directions. The softer is the sealing portion 8, the greater will this wrinkling tendency be.

Figure 3:
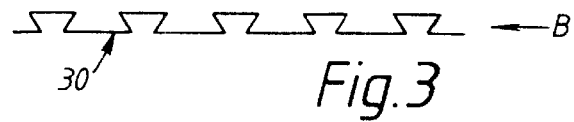
FIG. 3 is a perspective view of a reinforcement which can be used in the sealing strip of FIG. 2.

Therefore, in according to a feature of the sealing strip, a reinforcement 30 is incorporated within the wall 28. The reinforcement 30 may comprise a length of looped wire of generally zig-zag confiruation. Instead, it could be a thin metal sheet as shown in FIG. 3. Other forms of reinforcement are possible. The reinforcement 30 can be incorporated into the wall 28 by co-extrusion during the extrusion process. The metal sheet of FIG. 3 is designed so as to be relatively compressible in the direction of the arrow B but relatively stiff in the direction perpendicular to the plane of the Figure. If wire is used for the reinforcement 31, it would be similarly arranged.

It is found that the incorporation of the reinforcement 30 considerably increases the stiffness of the sealing portion 8 in the directions of the arrow D without reducing the effective softness in the direction of the arrow E. The increased stiffness in the direction of the arrow D reduces or substantially eliminates any tendency of the sealing portion 8 to wrinkle at, or "bridge across", bends or curves in the mounting flange. In this way, therefore, it is possible for the sealing portion 8 to be made of substantially softer material than hitherto because the increased tendency of such very soft material to wrinkle at or bridge-across bends or corners is substantially eliminated by the incorporated reinforcement 30.

What is claimed is:

1. A sealing strip, comprising a longitudinally extending sealing part defining a longitudinal hollow interior which becomes partially compressed in use to carry out a sealing function, the hollow interior having an interior wall extending along and across it, the interior wall incorporating reinforcing material which is compressible in a direction longitudinally of the strip but is stiff in the perpendicular lying in the plane of the wall and which resists partial collapse of the hollow interior when bending of the sealing strip in a longitudinal direction of the hollow interior occurs.

2. A strip according to claim 1, in which the interior wall lies in a plane which is inclined to the plane in which the bent longitudinal axis lies.

3. A strip according to claim 1, in which the reinforcing material is a metal sheet.

4. A strip according to claim 1, in which the sealing part is made of at least two different flexible materials.

5. A strip according to claim 4, in which the two materials respectively define parallel longitudinally extending hollow chambers arranged side-by-side with the two materials in contact so that the hollow chambers together define the hollow interior and the contacting materials define the interior wall.

6. A strip according to claim 5, including a third material forming a thin outer layer over the first two materials.

7. A strip according to claim 4, comprising a longitudinally extending mounting part, the sealing part being carried by the mounting part for mounting the sealing part along the surround of an opening to be sealed, the mounting part being formed of material which is integral with one of the said two materials.

8. A strip according to claim 1, comprising a longitudinally extending mounting part, the sealing part being carried by the mounting part for mounting the sealing part along the surround of an opening to be sealed.

9. A strip according to claim 8, in which the mounting part is channel-shaped.

* * * * *